R. W. PRINGLE.
WHEEL.
APPLICATION FILED JUNE 27, 1917.

1,244,543.

Patented Oct. 30, 1917.

Inventor,
R. W. Pringle
by W. E. Evans,
Attorney.

UNITED STATES PATENT OFFICE.

ROBERT W. PRINGLE, OF GATOOMA, SOUTHERN RHODESIA, SOUTH AFRICA.

WHEEL.

1,244,543.  Specification of Letters Patent.  Patented Oct. 30, 1917.

Application filed June 27, 1917. Serial No. 177,342.

*To all whom it may concern:*

Be it known that I, ROBERT WILLIAM PRINGLE, a subject of the King of Great Britain and Ireland, residing at Gatooma, Southern Rhodesia, South Africa, have invented certain new and useful Improvements Relating to Wheels, of which the following is a specification.

This invention relates to wheels and while of general application is more especially applicable to the wheels of motor vehicles.

The invention has for its object to dispense with the necessary use of rubber except for the inner tube of the tire of the wheel and to carry the load upon the wheel over the whole upper surface of the pneumatic tube instead of upon that part of the pneumatic tube adjacent to that part of the tread in contact with the road surface so that thus a very resilient wheel is produced while side slip is minimized and puncture prevented.

A wheel may thus be produced according to the invention of a durable construction.

According to the invention the load is transmitted through the spokes of the wheel to the upper surface of a continuous elastic element such as a pneumatic tube similar to the inner tube of pneumatic tires. The load is transmitted to the upper part of the elastic element or tube which is disposed within the annular cavity formed in a continuous circular metal rim whereby the load is carried by the whole upper part of the said rim and consequently of the complete wheel instead of as in an ordinary pneumatic tire wheel by the small area of the tire at a time in contact with the road.

The invention comprises the construction which is hereinafter described.

The invention is illustrated in the accompanying drawings in which—

Figure 2:
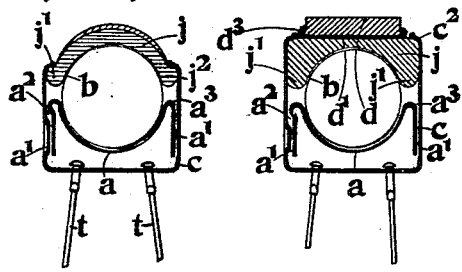
Fig. 2 is a cross section of a modification showing the tire or tread of a form similar to the outer cover of an ordinary pneumatic tire.
Figure 3:
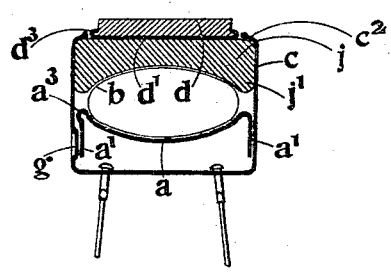
Fig. 3 is a transverse section of the form shown in Fig. 1.
Figure 5:
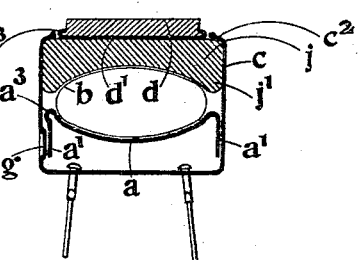
Fig. 5 is a cross section of a modification.

In carrying the invention into effect I construct the tire of the wheel of a continuous inner rim $a$ (Figs. 1 and 2) whose cross section at its peripheral surface, is semi-circular as illustrated in Figs. 2 and 3, semi-elliptical as illustrated in Fig. 5 or of any other suitable form whereby an annular cavity is provided in the rim for the reception of a rubber tube $b$ capable of inflation, the depth of the annular cavity in the inner rim $a$ being such that the inner part or half of the tube $b$ is inclosed by it.

The inner rim $a$ may be provided on each side with an integral inwardly extending vertical flange $a^1$. A number of segments $c$ are provided of a substantially U-shape in cross section extending in succession around the tire having their outwardly extending edges provided or formed for engagement with the tire $j$, and having the sides of the section parallel and the intermediate part for the reception of the outer end of the spokes $t$. The outer edges of the segments may be connected to the tire by merely turning the edges inwardly to secure the edges of the tread as indicated at $c^2$ (Fig. 3). Where the tire $j$ consists of a cover similar to the ordinary cover of a pneumatic tire, the outer edges $c^2$ of the segments may engage the lateral beaded edges $j^2$ of the cover as illustrated in Fig. 2, or the lateral edges of the cover $j$ may be engaged by the segments in any other suitable way. By such means it will be understood that the tire is connected to the hub $e$ of the wheel through the U-shaped segments $c$.

The segments $c$ may be provided with their lateral edges $c^1$ radially disposed and the segments may be of any suitable number. For example each segment $c$ may be connected to the hub $e$ by two sets of spokes one set upon each side of the central plane of the wheel. By such a construction it will be understood that the inner rim $a$ is embraced by the U-shaped segments $c$ in such a manner that their relative movement is possible and that the depth of the U-shaped segments $c$ is such as to permit of this movement.

Figure 1:
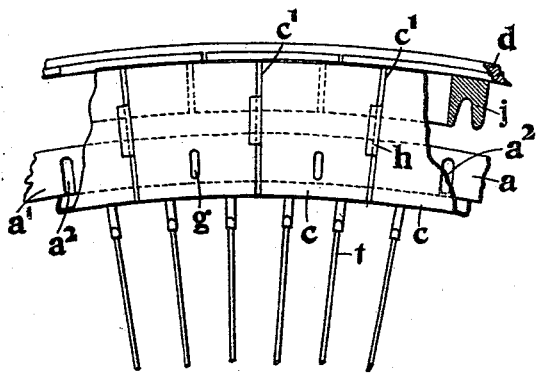
Figure 1 shows in side elevation part of the tire of a wheel constructed according to the invention, parts being broken away to disclose the construction.

The tire $j$ is provided with a continuous flexible rim or band which may take a form similar to that of the outer cover of an ordinary pneumatic tire as illustrated in Fig. 1. The tire $j$ may be provided with an annular cavity on its inner face having a semi-circular cross section as illustrated in Fig. 3 or a semi-elliptical cross section as illustrated in Fig. 5, or any other suitable cross section for the reception of the outer part of the elastic element or tube $b$. The annular cavity formed under the tire may be struck from the same center as the cavity in the inner rim $a$. The segments $c$ may be connected to the hub by wire spokes in a manner similar to wire wheels of ordinary construction, except that they are capable of sliding into the segments and are thus incapable of resisting compression.

On the load being transmitted by tension to the respective segments in succession through the spokes $t$ from the hub $e$, the segments 1—1 (Fig. 8) for the moment in the uppermost position are drawn down against the resistance of the air under pressure in the elastic element or tube $b$, which in consequence is slightly deformed until the load is removed when it again assumes its original form.

The outer edges $a^3$ of the inner rim and the inner edges $j^1$ of the tire $j$ are so disposed as to allow of this deformation without the possibility of the tube or element $b$ being nipped or engaged on the respective edges $a^3$ and $j^1$ coming together. Any suitable means may be provided for maintaining the U-shaped segments $c$ in their proper radial position with reference to the inner rim. For example radial depressions or slots $a^2$ may be provided in the flanges $a^1$ of the inner rim $a$ and corresponding radial pins, projections or ridges $g$ may be provided in the segments $c$ to engage within the depressions or slots aforesaid, so that the segments $c$ under the action of load in approaching or receding from the hub $e$ will follow the line of the slot or depression, and in consequence the segments will not become displaced or foul one another.

It will be understood that as the segments $c$ are radially disposed to embrace the inner rim $a$ they cannot be made to abut against one another, it being necessary to provide their edges radial as aforesaid, and to allow a small space between each section or segment, but such space in a wheel of an ordinary motor vehicle will not require to be more than about $\frac{1}{16}$ of an inch. This space would expose the inner tube or element $b$ to the extent of the space between the tire $j$ and the inner rim $a$, and it is for this purpose that the segments $c$ are preferably provided to overlap one another at their radial edges as at $h$, so as thus to form a sliding cover which besides covering the part of the inner tube or element $b$ exposed, forms a means to resist side stress imposed upon the tire.

Figure 4:
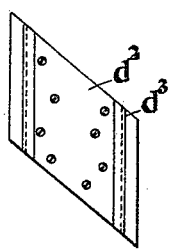
Fig. 4 is a plan view corresponding to Fig. 3 and showing one of the metal shoes by which the continuous flexible tread band is mounted in position upon a sectional tire block of which the outer tire may be formed.
Figure 6:
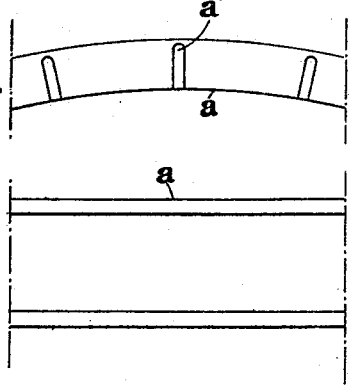
Figs. 6 and 7 show in detail, in side elevation and plan respectively a part of the inner rim.
Figure 7:
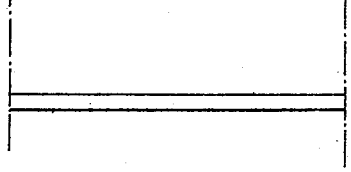

The tire may be made as a continuous band of any flexible material such as rubber and canvas as in Fig. 2 or as belting, leather or the like, and this flexible material may be shod with puncture resisting material in the usual way. The flexible band $d$ may be mounted in position within a rim $d^1$ having inturned edges $d^3$ to engage the edges of the band. The tire $j$ may be shod with metal shoes such as $d^2$ (Fig. 4) secured to the tire $j$ turned up at their edges $d^3$ in such a fashion as to engage the flexible band $d$. By such means a continuous tread surface is provided while the metal shoes engaging the continuous tread render the tire puncture proof. The metal shoes may be disposed with their contiguous edges diagonal to the plane of the wheel at the same angle as the segments but arranged to break joint with them.

It will be understood that inasmuch as the load on the hub is carried on so large an elastic area as the whole upper surface of the wheel it is unnecessary to use rubber in the construction except in the case of the inner tube $b$.

Figure 8:
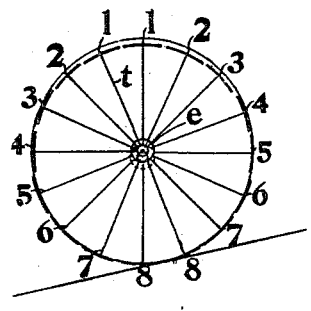
Fig. 8 is a diagrammatic side elevation of the complete wheel indicating its operation.

The action of the tire under load is as follows: When the load comes on to the hub $e$ of the wheel it is transmitted through the spokes $t$ to the upper half of the wheel. Under the load the segments $c$ are drawn toward the hub, those 1—1 for the moment immediately above the hub to the greatest extent and the ones on either side, namely 2, 3 and 4 to a less degree. Just before reaching a line drawn through the hub $e$ parallel with the road surface this drawing down action on the segments ceases, and is replaced by a tendency for the segments to be forced outward owing to the slight deformation due to pressure on the upper portion of the wheel. This is indicated by the position of the segments 4, 5, 6 and 7 (Fig. 8). Toward the lower part of the tire this outward tendency decreases until it ceases altogether at the point immediately below the hub $e$ at the segments 8—8. Here the spokes $t$ immediately under the hub $e$ pass freely through the hole in the segments to which they are connected and are under no strain whatever. It will thus be understood that the spokes connect the segments to the hub in such manner as to resist tension and not compression, and the load is transmitted to the wheel by tension upon those spokes for the time being in the uppermost position, to the corresponding segments $c$ and thence to the tire $j$, through the tube $b$ to the inner rim $a$ by which it is transmitted to the part of the tire for the time being in the lowermost position in contact with the road surface.

The tire may be formed of a number of blocks of wood or other material on their inner face formed with a cavity for the reception of the outer part of the inner tube.

It will be understood that it is preferred to provide the segments of substantially U-shape with sides that are vertically disposed to lie against the lateral flanges of the inner rim but no limitation is involved to this form of the segments.

I claim:—

1. A wheel comprising an annular inner rim, an outer tire, an elastic element between the rim and the tire, means for connecting the tire to the hub consisting of segments engaging the tire at each side and spokes by which the segments are connected to the hub, the said spokes being connected to said segments to resist and to transmit tension only, substantially as described.

2. A wheel comprising an annular inner rim, an outer tire, an elastic element between the rim and the tire, means for connecting the tire to the hub consisting of segments of substantially U-shape in cross section extending in succession to inclose the inner rim and to engage the outer tire at its outer edges, and spokes by which the segments are connected to the hub, the said spokes being connected to said segments to resist and to transmit tension only, substantially as described.

3. A wheel comprising an annular inner rim, an annular cavity therein for the reception of an elastic element, a tire having an annular cavity on its inner surface for the reception of the outer part of the said elastic element, segments arranged in succession to inclose the said inner rim and to engage the respective edges of the tire and spokes by which the respective segments are connected to the hub, substantially as described.

4. A wheel comprising an annular inner rim and an outer tire, a pneumatic tube disposed between the said inner rim and tire, segments disposed in succession to inclose the inner rim and to engage the tire at its respective outer edges, means for maintaining the segments in the same radial position with respect to the inner rim, and spokes by which the respective segments are connected to the hub, substantially as described.

5. A wheel comprising an annular inner rim and an outer tire, an elastic element between the said annular inner rim and the outer tire, the said inner rim being provided with vertical flanges on each side, segments of a substantially U-shape in cross section having their sides adapted to lie and to slide upon the vertical flanges of the inner rim, means by which the edges of the tire may be engaged by the segments and spokes by which the segments are connected to the hub, substantially as described.

R. W. PRINGLE.

Copies of this patent may be obtained for five cents each, by addressing the "Commissioner of Patents, Washington, D. C."